United States Patent
Kim et al.

(10) Patent No.: US 12,191,520 B2
(45) Date of Patent: Jan. 7, 2025

(54) SEPARATOR FOR LITHIUM-SULFUR BATTERY, AND LITHIUM-SULFUR BATTERY COMPRISING SAME

(71) Applicant: LG ENERGY SOLUTION, LTD., Seoul (KR)

(72) Inventors: Myeongseong Kim, Daejeon (KR); Suenghoon Han, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 596 days.

(21) Appl. No.: 17/605,308

(22) PCT Filed: Apr. 24, 2020

(86) PCT No.: PCT/KR2020/005460
§ 371 (c)(1),
(2) Date: Oct. 21, 2021

(87) PCT Pub. No.: WO2020/226310
PCT Pub. Date: Nov. 12, 2020

(65) Prior Publication Data
US 2022/0200095 A1 Jun. 23, 2022

(30) Foreign Application Priority Data

May 3, 2019 (KR) .................... 10-2019-0052470
Apr. 20, 2020 (KR) .................... 10-2020-0047143

(51) Int. Cl.
*H01M 50/431* (2021.01)
*H01M 10/052* (2010.01)
(Continued)

(52) U.S. Cl.
CPC ....... *H01M 50/431* (2021.01); *H01M 10/052* (2013.01); *H01M 50/443* (2021.01);
(Continued)

(58) Field of Classification Search
CPC ............. H01M 50/431; H01M 10/052; H01M 50/443; H01M 50/449; H01M 50/489;
(Continued)

(56) References Cited

U.S. PATENT DOCUMENTS

2009/0226809 A1* 9/2009 Vu .................. H01M 50/446
429/231.95
2015/0162585 A1* 6/2015 Pan ........................ C08K 3/22
524/430
(Continued)

FOREIGN PATENT DOCUMENTS

CN 105140447 A 12/2015
CN 109148841 A 1/2019
(Continued)

OTHER PUBLICATIONS

National Library of Medicine retrieved from https://pubchem.ncbi.nlm.nih.gov/compound/Montmorillonite, and Sigma-Aldrich retrieved from https://www.sigmaaldrich.com/US/en/search/montmorillonite?focus=products&page=1&perpage=30&sort=relevance&term=montmorillonite&type=product (Year: 2024).*
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

Disclosed is a separator for a lithium-sulfur battery and a lithium-sulfur battery including the same. In particular, disclosed is a separator for a lithium-sulfur battery including a porous substrate and an inorganic coating layer present on at least one surface of the porous substrate wherein the inorganic coating layer includes a modified montmorillonite substituted with at least one specific ion. The separator may include a uniform inorganic coating layer by including a
(Continued)

modified montmorillonite, and thus adsorbs lithium polysulfide, thereby improving the capacity and lifetime characteristics of the lithium-sulfur battery.

12 Claims, 5 Drawing Sheets

(51) Int. Cl.
   *H01M 50/443* (2021.01)
   *H01M 50/449* (2021.01)
   *H01M 50/489* (2021.01)
   *H01M 50/491* (2021.01)
(52) U.S. Cl.
   CPC ....... *H01M 50/449* (2021.01); *H01M 50/489* (2021.01); *H01M 50/491* (2021.01)
(58) Field of Classification Search
   CPC .. H01M 50/491; H01M 10/4235; Y02E 60/10
   See application file for complete search history.

(56) References Cited

U.S. PATENT DOCUMENTS

| | | | |
|---|---|---|---|
| 2016/0164103 A1 | 6/2016 | Son et al. | |
| 2016/0336614 A1* | 11/2016 | Hatta | B60L 50/64 |
| 2018/0083248 A1 | 3/2018 | Um et al. | |

FOREIGN PATENT DOCUMENTS

| | | |
|---|---|---|
| JP | 2015-115321 A | 6/2015 |
| KR | 2002-0020312 A | 3/2002 |
| KR | 10-2008-0017110 A | 2/2008 |
| KR | 10-2011-0027644 A | 3/2011 |
| KR | 10-2014-0124336 A | 10/2014 |
| KR | 10-2016-0037084 A | 4/2016 |
| KR | 10-2016-0046775 A | 4/2016 |
| KR | 10-2018-0020096 A | 2/2018 |
| KR | 10-2018-0031609 A | 3/2018 |

OTHER PUBLICATIONS

Sigma-Aldrich retrieved from https://www.sigmaaldrich.com/US/en/search/montmorillonite?focus=products&page=1&perpage=30&sort=relevance&term=montmorillonite&type=product (Year: 2024).*
Sigma-Aldrich, Nanoclays in Multi-Functional Composites retrieved from https://www.sigmaaldrich.com/US/en/technical-documents/technical-article/materials-science-and-engineering/polymer-synthesis/nanoclay-building-montmorillonites , (Year: 2024).*
Ahn et al., "Correction: Interaction mechanism between a functionalized protective layer and dissolved polysulfide for extended cycle life of lithium sulfur batteries", J. Mater. Chem. A, 2015, vol. 3, pp. 9461-9467, total 9 pages.
Chen et al., "Atomic Interlamellar Ion Path in High Sulfur Content Lithium-Montmorillonite Host Enables High-Rate and Stable Lithium-Sulfur Battery", Adv. Mater., 2018, 1804084, total 8 pages.
International Search Report for PCT/KR2020/005460 mailed on Aug. 5, 2020.
Extended European Search Report for European Application No. 20802758.1, dated Apr. 14, 2022.
N.N "Montmorillonite K 10" Jan. 1, 2000, pp. 1-2, XP055910120, https://www.sigmaaldrich.com/DE/de/product/aldrich/69866.

* cited by examiner

SEPARATOR FOR LITHIUM-SULFUR BATTERY, AND LITHIUM-SULFUR BATTERY COMPRISING SAME

TECHNICAL FIELD

The present application claims the benefit of Korean Patent Application No. 10-2019-0052470 filed on May 3, 2019 and Korean Patent Application No. 10-2020-0047143 filed on Apr. 20, 2020 with the Korean Intellectual Property Office, the disclosure of which are herein incorporated by reference in their entirety.

The present invention relates to a separator for a lithium-sulfur battery and a lithium-sulfur battery comprising the same.

BACKGROUND ART

As the utilization range of lithium secondary batteries is expanded not only to portable electronic devices and communication devices, but also to electric vehicles (EV) and electric storage systems (ESS), the demand for high capacity of lithium secondary batteries used as their power sources is increasing.

The lithium-sulfur battery among various lithium secondary batteries is a secondary battery using a sulfur-based material having a sulfur-sulfur bond (an S—S bond) as a positive electrode active material and using lithium metal, a carbon-based material in which intercalation/deintercalation of lithium ions occurs, or silicon or tin that forms an alloy with lithium as a negative electrode active material.

There is an advantage that sulfur, which is the main material of the positive electrode active material in the lithium-sulfur battery, has a low atomic weight, is very rich in resources and thus easy to supply and receive, and is cheap, non-toxic, and environmentally friendly.

In addition, the lithium-sulfur battery has a theoretical discharging capacity of 1.675 mAh/g derived from a conversion reaction of lithium ion and sulfur ($S_8+16Li^++16e^-\rightarrow 8Li_2S$) in the positive electrode, and if lithium metal (theoretical capacity: 3,860 mAh/g) is used as the negative electrode, the theoretical energy density is 2,600 Wh/kg. Since the energy density of the lithium-sulfur battery is much higher than the theoretical energy density of other battery systems currently under study (Ni-MH battery: 450 Wh/kg, Li-FeS battery: 480 Wh/kg, Li—$MnO_2$ battery: 1,000 Wh/kg, Na-S battery: 800 Wh/kg) and commercial lithium secondary batteries ($LiCoO_2$/graphite), the lithium-sulfur battery is attracting attention as a high-capacity, eco-friendly, and low-cost lithium secondary battery among secondary batteries that have been developed to date, and is a next-generation battery system to which several studies are being conducted.

During the discharging of the lithium-sulfur battery, a reduction reaction in which sulfur accepts electrons occurs at the positive electrode and an oxidation reaction in which lithium is ionized occurs at the negative electrode. The lithium-sulfur battery generates lithium polysulfide ($Li_2S_x$, x=2 to 8) in the positive electrode during the discharging, and the lithium polysulfide is dissolved in the electrolyte and leached from the positive electrode, the reversible capacity of the positive electrode is greatly reduced, and the dissolved lithium polysulfide diffuses to the negative electrode, causing various side reactions. Also, during the charging process, the lithium polysulfide causes a shuttle reaction, thereby significantly reducing the charging/discharging efficiency.

Since the leaching of the lithium polysulfide adversely affects the capacity and lifetime characteristics of the battery, various techniques have been proposed to solve the problem of lithium polysulfide.

As an example, Korean Patent Publication No. 2018-0020096 discloses that by including a separator having a catalyst layer containing a transition metal compound, the shuttle reaction due to the leaching of the lithium polysulfide can be suppressed and thus the capacity and cycle characteristics of the battery can be improved.

In addition, Korean Patent Publication No. 2016-0046775 discloses that it is possible to improve the cycle characteristics of a battery by providing a positive electrode coating layer made of an amphiphilic polymer on a part of the active part of the positive electrode containing a sulfur-carbon composite, thereby inhibiting the leaching of the lithium polysulfide and facilitating the movement of lithium ions.

In addition, Korean Patent Publication No. 2016-0037084 discloses that by coating graphene on the carbon nanotube aggregate containing sulfur, the lithium polysulfide is prevented from being leached, and the electrical conductivity of the sulfur-carbon nanotube composite and the loading amount of sulfur can be increased.

These patents prevent the loss of sulfur to improve the problem of performance or lifetime degradation of the lithium-sulfur battery to some extent, by introducing a substance capable of adsorbing the lithium polysulfide into the positive electrode or separator, but the effect is insufficient. In addition, a deterioration problem may occur due to the newly introduced material, and the methods presented in these patents are somewhat complicated, and also when changing composition of the positive electrode, there is a problem that the amount of sulfur, a positive electrode active material (i.e. loading amount) that can be introduced is limited. Therefore, it is necessary to develop a lithium-sulfur battery having excellent performance by solving the leaching problem of lithium polysulfide.

PRIOR ART DOCUMENT

Patent Document

Korea Patent Publication No. 2018-0020096 (Feb. 27, 2018), Separator for lithium sulfur batteries with catalyst coating.

Korea Patent Publication No. 2016-0046775 (Apr. 29, 2016), CATHODE FOR LITHIUM-SULFUR BATTERY AND METHOD OF PREPARING THE SAME.

Korea Patent Publication No. 2016-0037084 (Apr. 5, 2016), SURFUR-CARBONNANOTUBE COMPLEX, METHOD OF PREPARING THE SAME, CATHODE ACTIVE MATERIAL FOR LITHIUM-SULFUR BATTERY INCLUDING THE SAME AND LITHIUM-SULFUR BATTERY INCLUDING THE SAME.

DISCLOSURE

Technical Problem

As a result of various studies to solve the above problems, the inventors of the present invention have confirmed that the performance and lifetime of the lithium-sulfur battery can be improved by introducing an inorganic coating layer comprising a modified montmorillonite, in which the monovalent or divalent cation of the montmorillonite was substituted with a specific ion, on the substrate of the separator, and thus solving the problems of the leaching of the lithium polysulfide in the lithium-sulfur battery, thereby having completed the present invention.

Accordingly, it is an object of the present invention to provide a separator for a lithium-sulfur battery that improves the capacity and lifetime characteristics of a lithium-sulfur battery by solving the problems caused by the leaching of the lithium polysulfide.

In addition, it is another object of the present invention to provide a lithium-sulfur battery comprising the above-mentioned separator.

Technical Solution

In order to achieve the above objects, the present invention provides a separator for a lithium-sulfur battery comprising a porous substrate and an inorganic coating layer formed on at least one surface of the porous substrate, wherein the inorganic coating layer includes a modified montmorillonite in which cations in montmorillonite are substituted with at least one ion selected from hydrogen ion, lithium ion, potassium ion, rubidium ion, cesium ion, iron ion, manganese ion and nickel ion.

The montmorillonite may be at least one selected from the group consisting of sodium montmorillonite, calcium montmorillonite and magnesium montmorillonite.

The modified montmorillonite may be an exfoliated layered structure.

The modified montmorillonite may be in the form of a nanosheet.

The modified montmorillonite may comprise diffraction peaks that appear at diffraction angles (2θ) in the range of 7.0±1.0°, 9.0±1.0°, 20.0±1.0°, 26.5±1.0° and 28.0±0.5°, respectively, as measured by X-ray diffraction (XRD).

The inorganic coating layer may have a thickness of from 0.1 to 10 μm.

In addition, the present invention provides a lithium-sulfur battery comprising the above-mentioned separator for lithium-sulfur battery.

Advantageous Effects

The separator according to the present invention includes an inorganic coating layer including a modified montmorillonite substituted with a specific ion, wherein the modified montmorillonite exhibits an excellent adsorption effect on the lithium polysulfide by showing the form of a nanosheet having an interlayer structure formed by being exfoliated, and thus being uniformly coated on a porous substrate, and thus improves the capacity and lifetime characteristics of the lithium-sulfur battery comprising the same.

Therefore, the lithium-sulfur battery equipped with a separator having an inorganic coating layer comprising the modified montmorillonite is capable of realizing a high-capacity battery because there is no deterioration in the capacity of sulfur, and can be applied stably with high loading of sulfur. In addition, the lithium-sulfur battery has the advantage of high charging/discharging efficiency of the battery and improved lifetime characteristics.

BEST MODE

Figure 1:
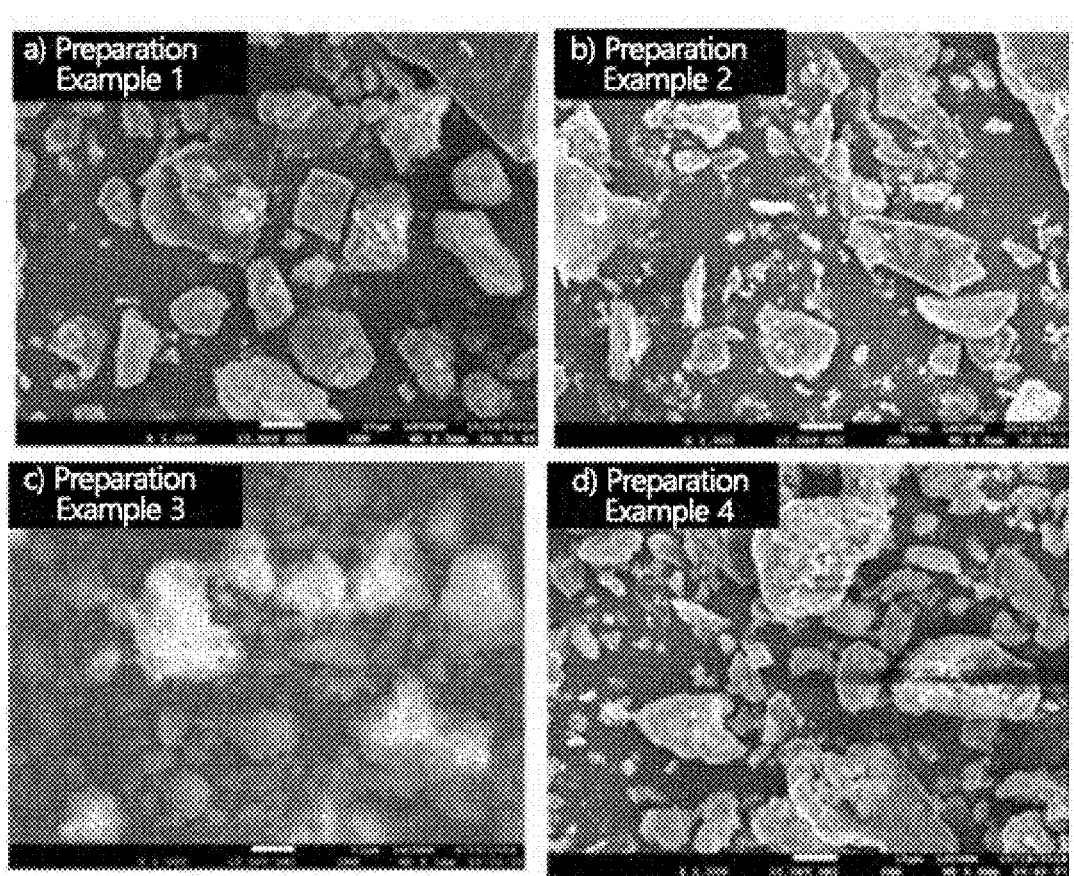
FIG. 1 is an image from a scanning electron microscope (SEM) of the montmorillonite according to Preparation Examples 1 to 4 of the present invention (a) Preparation Example 1, b) Preparation Example 2, c) Preparation Example 3, d) Preparation Example 4).

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used in the present invention is for the purpose of describing particular embodiments only and is not intended to be limiting of the invention. The singular forms include plural referents unless the context clearly dictates otherwise. It is to be understood that the terms "comprise" or "have" as used in the present invention, are intended to designate the presence of stated features, numbers, steps, operations, components, parts or combinations thereof, but not to preclude the possibility of the presence or addition of one or more other features, numbers, steps, operations, components, parts, or combinations thereof.

In the present invention, the term "porosity" means the ratio of the volume occupied by the pores to the total volume in a structure, and its unit is %. In the present invention, the measurement of the porosity is not particularly limited. For example, according to one embodiment of the present invention, the micro and meso pore volume can be measured by, for example, a Brunauer-Emmett-Teller (BET) measurement method or a Hg porosimeter.

The lithium-sulfur battery has higher theoretical discharging capacity and theoretical energy density than other various secondary batteries, and is attracting attention as a next-generation secondary battery due to the advantage that sulfur, which is used as a positive electrode active material, is rich in resources and is cheap and environmentally friendly.

Sulfur, which is used as a positive electrode active material in the lithium-sulfur battery, is converted from the cyclic $S_8$ structure to the linear structures of lithium polysulfides ($Li_2S_x$, x=8, 6, 4, 2) by the reduction reaction and, when the lithium polysulfides are completely reduced, lithium sulfide ($Li_2S$) is finally produced. Among the lithium polysulfides which are the intermediate products of this sulfur reduction reaction, lithium polysulfides ($Li_2S_x$, usually x>4), which has the high oxidation number of sulfur, are substances with a strong polarity, and are easily dissolved in the electrolyte comprising a hydrophilic organic solvent and thus released outside the reaction zone of the positive electrode, thereby no longer participating in the electrochemical reaction and thus resulting in the loss of sulfur.

Despite advantages as described above, since the amount of sulfur involved in the electrochemical reaction is sharply reduced due to this sulfur leaching, the lithium-sulfur battery does not realize all of theoretical capacity and energy density in actual operation. In addition, due to the side reaction of lithium metal used as the negative electrode and lithium polysulfide, there is a problem that the degradation of initial capacity and the cycle characteristics are accelerated after certain cycles.

For this purpose, in the prior art, there has been proposed a method of introducing an substance capable of inhibiting the leaching of lithium polysulfide into the positive electrode or the separator in the form of an additive or a polymer coating layer containing the same, a method of changing the composition of the electrolyte, a method of forming a protective layer or a solid-electrolyte interphase (SEI) layer on the surface of the negative electrode or the like. However, there are disadvantages that such a method is not only insufficient in improving the effect of leaching of lithium polysulfide, but also has limitations in the amount of loading of sulfur, causes serious problems in the stability of the battery, or is inefficient in view of the process.

Therefore, the present invention provides a separator for a lithium-sulfur battery having an excellent inhibitory effect on leaching of lithium polysulfide, by forming an inorganic coating layer with modified montmorillonite having an exfoliated layered structure so that the adsorbent for lithium polysulfide is evenly distributed and exhibit uniform adsorption performance.

Specifically, the separator for the lithium-sulfur battery according to the present invention comprises a porous substrate and an inorganic coating layer formed on at least one surface of the porous substrate, wherein the inorganic coating layer comprises a modified montmorillonite in which cations of montmorillonite are substituted with specific ions.

The porous substrate constituting the separator for the lithium-sulfur battery of the present invention enables the transport of lithium ions between a negative electrode and a positive electrode while separating or insulating the negative electrode and the positive electrode from each other. Therefore, the separator of the present invention may be made of a porous, nonconductive or insulating material. Also, the separator may be an independent member such as a film.

Specifically, the porous substrate may be a porous polymer film alone or a laminate of porous polymeric films, and for example, may be a non-woven fabric made of glass fiber or polyethyleneterephthalate fiber with high melting point, etc. or a polyolefin-based porous film, but is not limited thereto.

The material of the porous substrate is not particularly limited in the present invention, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, nylon, poly(p-phenylene benzobisoxazole and polyarylate.

The thickness of the porous substrate is not particularly limited, but may be from 1 to 100 μm, preferably from 5 to 50 μm. Although the thickness range of the porous substrate is not particularly limited to the above-mentioned range, when the thickness is excessively thinner than the lower limit described above, mechanical properties are deteriorated and thus the separator may be easily damaged during use of the battery.

The size and porosity of the pores present in the porous substrate are also not particularly limited, but may be from 0.001 μm to 50 μm and from 10 to 95%, respectively.

In the present invention, the inorganic coating layer is formed on at least one surface of the aforementioned porous substrate, and includes modified montmorillonite.

The modified montmorillonite of the present invention is substituted with a specific ion, and is specifically the modified montmorillonite in which a monovalent or trivalent cation present in the interlayer of bare montmorillonite (MMT) is treated with a compound capable of ion exchange reaction with the corresponding cation.

The bare montmorillonite is a type of smectite, which is a clay mineral, and has a formula represented by $(Na,Ca)_{0.33}(Al,Mg)_2(Si_4O_{10})(OH)_2 \cdot nH_2O$. The bare montmorillonite consists of a combination of a silica tetrahedral sheet and an alumina octahedral sheet, and is formed by forming a layered structure through condensation reaction by a hydroxyl group between two silica tetrahedral sheets and one alumina octahedral sheet. The bare montmorillonite has a structure in which aluminum ions ($Al^{3+}$) are substituted with magnesium ions ($Mg^{2+}$) and iron ions ($Fe^{2+}$, $Fe^{3+}$) in the alumina octahedral sheet and silica ions ($Si^{4+}$) are substituted with aluminum ions ($Al^{3+}$) in the silicate tetrahedral sheet, and thus has a negative charge as a whole. Accordingly, the bare montmorillonite contains cations and water molecules that can be exchanged between the layers to balance the overall charge.

As described above, on the surface of the bare montmorillonite, a hydroxyl group ($OH^-$ radical) or an oxygen group ($O^-$ radical) is mainly distributed, and thus the bare montmorillonite is used in the prior art because it can adsorb lithium polysulfide. However, the montmorillonite used in the prior art is a bare montmorillonite that is not modified, or has a form modified with ammonium ions ($NH_4^+$) and thus still has a layered structure and has strong polarity, so it sucks water present in the interlayer to create a coarse inner structure due to the swelling property that expands the volume. Such a coarse inner structure causes deformation of the shape by repeated contraction and expansion processes during the operation of the battery, and as a result, there is a problem that the performance and stability of the battery are significantly reduced.

Accordingly, in the present invention, an inorganic coating layer is formed by a modified montmorillonite in which cations such as sodium ions ($Na^+$), magnesium ions ($Mg^{2+}$) and calcium ions ($Ca^{2+}$) existing between layers of bare montmorillonite are substituted with at least one ion selected from the group consisting of hydrogen ion ($H^+$), lithium ion ($Li^+$), potassium ion ($K^+$), rubidium ion ($Rb^+$), cesium ion ($Cs^+$), iron ion ($Fe^{2+}$), manganese ion ($Mn^{2+}$) and nickel ion ($Ni^{2+}$) through a modifier, in view of the fact that when the monovalent or divalent cations contained between the layer structures of bare montmorillonite are subjected to a modifying treatment that substitutes with specific cations through an ion exchange reaction, the layer spacing is extended, and finally, the layered phase can be separated into each layer and exfoliated.

That is, since the modified montmorillonite according to the present invention has a more appropriate microstructure and a reduced thickness as the multi-layered structure is exfoliated to form a nanosheet, thus the modified montmorillonite can be uniformly and densely coated on the porous substrate. Accordingly, since the montmorillonite, an adsorbent for lithium polysulfide, is evenly distributed in the inorganic coating layer to effectively adsorb lithium polysulfide, the problem of loss of sulfur and capacity loss caused by the leaching of lithium polysulfide in the conventional lithium-sulfur battery is solved, and accordingly, the capacity and lifetime of the lithium-sulfur battery can be improved, and it can be stably operated even when sulfur is highly loaded.

In addition, the modified montmorillonite of the present invention solves the problem of side reactions on the surface of the negative electrode caused by the shuttle effect of lithium polysulfide, for example, the problem of formation of a high resistance layer of $Li_2S$ at the interface by reaction with lithium metal used as a negative electrode or the problem of the growth of lithium dendrites by the precipitation of lithium at the interface of the negative electrode, by confining the lithium polysulfide to the inorganic coating layer of the separator, thereby improving the coulomb efficiency and lifetime of the battery.

The montmorillonite is classified according to the type of cations present in the interlayer, and may include at least one selected from the group consisting of sodium montmorillonite, calcium montmorillonite and magnesium montmorillonite. Preferably, sodium montmorillonite may be used.

In the modified montmorillonite, a cation present in the interlayer may be substituted with at least one ion selected from hydrogen ion, lithium ion, potassium ion, rubidium ion, cesium ion, iron ion, manganese ion and nickel ion, and when considering the conductivity of lithium ion and the like, may be preferably substituted with at least one ion selected from hydrogen ion and lithium ion. More preferably, it may be substituted with lithium ion.

In one embodiment of the present invention, when the montmorillonite is sodium montmorillonite, the content of sodium ion (in terms of $Na_2O$) in the modified montmorillonite included in the inorganic coating layer of the present invention may be 0.4% or less, preferably from 0.01 to 0.05%.

In another embodiment of the present invention, when the montmorillonite is calcium montmorillonite, the content of calcium ions (in terms of CaO) in the modified montmorillonite included in the inorganic coating layer of the present invention may be 0.2% or less, preferably from 0.01 to 0.05%.

The modified montmorillonite of the present invention may be an exfoliated layered structure. This means that the bare montmorillonite having a layered structure formed by stacking a plurality of layers is exfoliated and formed in a nanosheet form as separation occurs between multiple layers by a modifying treatment that substitutes cations as described above. At this time, the nanosheet may have a thickness of from 3 to 100 nm, preferably from 10 to 20 nm. In addition, the length of the longest side of the nanosheet may be from 1 to 15 μm, preferably from 1 to 5 μm.

The average particle diameter (D50) of the montmorillonite may be from 1 to 15 μm. When the average particle diameter (D50) of the montmorillonite is within the above range, an appropriate exfoliated layered structure can be obtained, and thus an effect of using the montmorillonite can be obtained more effectively. Unless otherwise defined in the present invention, the average particle diameter (D50) refers to the diameter of particles having a cumulative volume of 50% by volume in the particle size distribution.

Whether the modified montmorillonite of the present invention has been modified may be confirmed by X-ray diffraction (XRD) measurement. A significant or effective peak in X-ray diffraction (XRD) analysis means a peak that is repeatedly detected in a substantially identical pattern in XRD data without being significantly affected by analytical conditions or analytical performers and in other words, means a peak having a height, intensity, strength, etc. of 1.5 times or more, preferably 2 times or more, more preferably 2.5 times or more, compared to a background level.

The modified montmorillonite of the present invention comprises effective diffraction peaks that appear in the range of diffraction angles (2θ) of 7.0±1.0°, 9.0±1.0°, 20.0±1.0°, 26.5±1.0° and 28.0±0.5°, respectively, as measured by X-ray diffraction (XRD) analysis using Cu-Kα X-ray wavelength, wherein it can be confirmed whether the modification was made through the presence or absence of an effective diffraction peak appearing at a diffraction angle of 7.0±1.0°.

The cation exchange capacity (CEC) of the modified montmorillonite may be from 90 to 150 mmol/100 g, preferably from 100 to 145 mmol/100 g. In the present invention, the cation exchange capacity is defined by the degree to which the montmorillonite can adsorb and exchange cations comprising exchangeable salt radicals and exchangeable hydrogen (unit: mmol/100 kg). Unless otherwise specified in the present invention, the cation exchange capacity is determined by the cobalt hexamine chloride ion exchange method, i.e. a method of determining the cation exchange capacity of montmorillonite using $[Co(NH_3)_6]^{3+}$ as the exchangeable cation.

The thickness of the inorganic coating layer in the separator for the lithium-sulfur battery according to the present invention is not particularly limited, and has a range that does not increase the internal resistance of the battery while ensuring the above effect. For example, the thickness of the inorganic coating layer may be from 0.1 to 10 μm, preferably from 0.1 to 5 μm, and more preferably from 0.1 to 1 μm. When the thickness of the inorganic coating layer is less than the above range, it cannot function as an inorganic coating layer. On the contrary, when the thickness of the inorganic coating layer exceeds the above range, the interfacial resistance may increase, thereby leading to an increase in internal resistance during operating of the battery.

A method for manufacturing the separator for the lithium-sulfur battery proposed in the present invention is not particularly limited in the present invention, and a variety of methods known to those skilled in the art, or variations thereof, are available.

As an example, a method for manufacturing the separator for the lithium-sulfur battery comprises the steps of:
   (a) preparing a modified montmorillonite substituted with a specific cation,
   (b) preparing a coating composition comprising the modified montmorillonite of step (a), and
   (c) applying the coating composition to at least one surface of a porous substrate.

First, the preparation of a montmorillonite substituted with a specific cation in step (a), i.e. a modified montmorillonite is performed by the reaction of bare montmorillonite and a modifier.

For example, when the modified montmorillonite is a modified montmorillonite substituted with hydrogen ions, it may be prepared by acid treatment of the bare montmorillonite with a hydrogen modifier. At this time, the acid treatment may be performed by a conventional method.

The bare montmorillonite may be at least one selected from the group consisting of sodium montmorillonite, calcium montmorillonite and magnesium montmorillonite. Preferably, it may be sodium montmorillonite.

The hydrogen modifier may be at least one selected from the group consisting of inorganic and organic acids. For example, the inorganic acid may be at least one selected from the group consisting of hydrochloric acid, nitric acid, hydrobromic acid, hydrofluoric acid, sulfuric acid, and sulfonic acid. The organic acid may be at least one selected from the group consisting of acetic acid, oxalic acid, citric acid, succinic acid, formic acid, propanoic acid, butyric acid, propanedioic acid, butanedioic acid, pyruvic acid, glutamic acid, tartaric acid, malic acid, lactic acid, fumaric acid, itaconic acid, ascorbic acid and α-ketoglutaric acid. Preferably, the hydrogen modifier may be sulfuric acid.

The concentration of the hydrogen modifier may be from 0.1 to 10 M, preferably from 0.5 to 8 M, more preferably from 0.8 to 5 M.

The bare montmorillonite may be acid treated by introducing the bare montmorillonite and the hydrogen modifier into an aqueous solvent such as deionized water and reacting with stirring for 12 to 24 hours.

At this time, the mass ratio of the bare montmorillonite and the hydrogen modifier may be from 1.0:1.0 to 1.0:8.0, preferably from 1.0:2.0 to 1.0:5.0. When the mass ratio of the bare montmorillonite and the acid is less than the above range, there may be a problem of incomplete cation exchange reaction. On the contrary, when the mass ratio exceeds the above range, there may be a problem that the crystal structure of montmorillonite collapses.

The acid treatment may be performed multiple times, preferably 1 to 10 times, more preferably 2 to 8 times.

After the acid treatment, the hydrogen modifier may be removed by centrifugation or filtration.

In addition, after the acid treatment, a process of washing several times with water and ethanol may be performed.

Next, the final product of the acid treatment may be dried at from 60 to 90° C. to obtain modified montmorillonite, specifically hydrogen modified montmorillonite (H-MMT). Preferably, the drying may be performed under a vacuum condition for from 12 to 24 hours.

In another example, when the modified montmorillonite is a modified montmorillonite substituted with lithium ions, the method for manufacturing the modified montmorillonite may comprise the step of acid-treating a bare montmorillonite with a hydrogen modifier and adding a lithium modifier to a solution containing hydrogen-modified montmorillonite (H-MMT) obtained through the acid-treatment.

The step of acid-treating the bare montmorillonite with the hydrogen modifier is as described above.

The lithium modifier may be various types of lithium hydroxide, lithium nitrate, lithium chloride and lithium sulfate, but preferably lithium hydroxide may be used, when considering the reaction conditions.

The concentration of the lithium modifier may be from 0.1 to 10 M, preferably from 0.5 to 8 M, more preferably from 0.8 to 5 M.

The lithium modifier may be added to a solution containing the hydrogen modified montmorillonite (H-MMT), and the resultant mixture may be stirred and reacted for from 12 to 24 hours.

In the step of adding the lithium modifier, the mass ratio of the hydrogen modified montmorillonite (H-MMT) and the lithium modifier may be from 1.0:1.0 to 1.0:8.0, preferably from 1.0:2.0 to 1.0:5.0. When the mass ratio of the acid-treated montmorillonite and the lithium modifier is less than the above range, there may be a problem that the cation exchange reaction is incomplete. On the contrary, when the mass ratio exceeds the above range, there may be a problem that the crystal structure of montmorillonite collapses.

After the reaction with the lithium modifier, the lithium modifier may be removed by centrifugation or filtration.

In addition, after the reaction with the lithium modifier, a process of washing several times with water and ethanol may be performed.

Next, the final product obtained from the reaction with the lithium modifier may be dried at from 60 to 90° C. to obtain a modified montmorillonite, specifically a lithium modified montmorillonite (Li-MMT). Preferably, the drying may be performed under a vacuum condition for from 12 to 24 hours.

Subsequently, step (b) of preparing a coating composition comprising the modified montmorillonite substituted with the specific cation prepared by the above-described manufacturing method is performed.

The coating composition may further include a solvent in addition to the modified montmorillonite substituted with the specific cation as described above, and the solvent is not particularly limited as long as it can dissolve the modified montmorillonite. As an example, the solvent may be a mixed solvent of water and alcohol, or a mixture of one or more organic solvents. In that case, the alcohol may be a lower alcohol having 1 to 6 carbon atoms, preferably methanol, ethanol, propanol, isopropanol or the like. Examples of the organic solvent may comprise polar solvents such as acetic acid, dimethyl formamide (DMF), N-methyl-2-pyrrolidone (NMP) and dimethyl sulfoxide (DMSO), and nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride, methylene chloride, tetrahydrofuran (THF), etc. Preferably, at least one selected from the group consisting of dimethylformamide, methylene chloride and N-methyl-2-pyrrolidone may be used.

The content of the solvent may be contained at a level of having such a concentration as to facilitate the coating, and the specific content varies depending on the coating method and apparatus. As an example, after dispersing the modified montmorillonite in a solvent, it may be mixed to prepare a coating composition. At this time, the concentration of the final coating composition may be adjusted to be in the range of from 0.1 to 10% by weight (solids content), and then the coating may be carried out.

Additionally, the coating composition may further comprise a binder to increase the binding force of the modified montmorillonite to the porous substrate during a coating process. For example, the binder may be polyvinylidene fluoride, polyvinyl alcohol, polyvinyl chloride, polyvinyl fluoride, polyvinylpyrrolidone, polyurethane, polytetrafluoroethylene, polyethylene, polypropylene and the like.

Subsequently, step (c) of applying the coating composition as described above to at least one surface of the porous substrate is performed.

The application in step (c) is not particularly limited in the present invention, and any known wet coating method may be used. As an example, the coating method may comprise a method of uniformly dispersing using a doctor blade and the like, and methods such as die casting, comma coating, screen printing and vacuum filtration coating.

Additionally, after step (c), a drying process for removing the solvent may be further performed. The drying process may be performed at a temperature and a time sufficient to sufficiently remove the solvent. The conditions may vary depending on the type of the solvent, and therefore, it is not specifically mentioned in the present invention. For example, the drying process may be carried out in a vacuum oven at from 30 to 200° C. Examples of the drying method may comprise a drying method by warm air, hot air, or low-humidity air, a vacuum drying method. The drying time is not particularly limited, but is usually in the range of from 30 seconds to 24 hours.

The coating thickness of the inorganic coating layer to be finally formed may be controlled by adjusting the concentration of the composition for the coating according to the present invention, the number of times of coating, or the like.

Also, the present invention provides a lithium-sulfur battery comprising the separator described above.

The lithium-sulfur battery comprises a positive electrode, a negative electrode, a separator interposed therebetween and an electrolyte, wherein the separator comprises the separator according to the present invention.

The positive electrode may comprise a positive electrode current collector and a positive electrode active material coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material may comprise a positive electrode active material and optionally an electrically conductive material and a binder.

The positive electrode active material comprises a sulfur-based compound. The sulfur-based compound may be at least one selected from the group consisting of inorganic sulfur ($S_8$), $Li_2S_n(n \geq 1)$, a disulfide compound, an organic sulfur compound and a carbon-sulfur polymer $((C_2S_x)_n$: x=2.5 to 50, n≥2). Preferably, inorganic sulfur ($S_8$) may be used.

The sulfur-based compound is used in combination with an electrically conductive material because it does not have electrical conductivity alone. Preferably, the positive electrode active material may be a sulfur-carbon composite.

The carbon in the sulfur-carbon composite is a porous carbon material and provides a framework capable of uniformly and stably immobilizing sulfur, which is a positive electrode active material, and supplements the electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of from 1 to 200 nm, and the porosity may be in the range of from 10 to 90% of the total volume of the pores. When the average diameter of the pores is less than the above range, the pore size is only at the molecular level and impregnation with sulfur is impossible. On the contrary, when the average diameter of the pores exceeds the above range, the mechanical strength of the porous carbon is weakened, which is not preferable for application to the manufacturing process of the electrode.

The shape of the porous carbon material may be in the form of sphere, rod, needle, plate, tube and bulk, and may be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and natural graphite, artificial graphite, expanded graphite, and activated carbon. Preferably, the porous carbon material may be carbon nanotubes.

In the present invention, the sulfur-carbon composite may include from 60 to 90 parts by weight, preferably from 65 to 85 parts by weight, more preferably from 70 to 80 parts by weight of sulfur based on 100 parts by weight of the sulfur-carbon composite. When the content of the sulfur is less than the above-mentioned range, as the content of the porous carbon material in the sulfur-carbon composite is relatively increased, the specific surface area is increased, so that the content of the binder should be increased when preparing the slurry. Increasing the amount of use of the binder may eventually increase the sheet resistance of the positive electrode and acts as an insulator preventing electron pass, thereby deteriorating the performance of the battery. On the contrary, when the content of the sulfur exceeds the above-mentioned range, as the sulfur or sulfur compounds that are not combined with the porous carbon material are aggregated with each other or re-leached to the surface of the porous carbon material, it is difficult to receive electrons and thus cannot participate in the electrochemical reaction, resulting in capacity loss of the battery.

The positive electrode active material may further comprise at least one additive selected from a transition metal element, a group IIIA element, a group IVA element, a sulfur compound of these elements and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg or the like, and the group IIIA element may comprise Al, Ga, In, Ti and the like, and the group IVA element may comprise Ge, Sn, Pb and the like.

The positive electrode active material may be included in an amount of from 50 to 95 parts by weight, preferably from 70 to 90 parts by weight based on 100 parts by weight of the slurry composition for the positive electrode. When the content of the positive electrode active material is less than the above range, it is difficult for the positive electrode to sufficiently exert an electrochemical reaction. On the contrary, when the content exceeds the above range, there is a problem that the resistance of the positive electrode is increased and the physical properties of the positive electrode are lowered due to a relatively insufficient content of the electrically conductive material and the binder to be described later.

In addition, the positive electrode may further comprise an electrically conductive material, and the electrically conductive material is a material that acts as a path, through which electrons are transferred from the current collector to the positive electrode active material, by electrically connecting the electrolyte and the positive electrode active material. The electrically conductive material may be used without limitation as long as it has porosity and electrical conductivity.

For example, carbon-based materials having porosity may be used as an electrically conductive material. Such carbon-based materials may comprise carbon black, graphite, graphene, activated carbon, carbon fiber, and the like. In addition, metallic fibers such as metal mesh; metallic powder such as copper, silver, nickel, and aluminum or organic electrically-conductive materials such as polyphenylene derivatives may be also used. The electrically conductive materials may be used alone or in combination.

The electrically conductive material may be included in an amount of from 1 to 10 parts by weight, preferably about from 5 parts by weight, based on 100 parts by weight of the slurry composition for the positive electrode. When the content of the electrically conductive material is less than the above range, the unreacted portion of the sulfur increases, and eventually capacity loss occurs. On the contrary, when the content exceeds the above range, it has a negative effect on high-efficiency discharging characteristics and charging/discharging cycle lifetime. Therefore, the content is preferably appropriately determined within the aforementioned range.

In addition, the positive electrode may further comprise a binder. The binder enhances adhesion force between the components constituting the positive electrode and between them and the current collector, and any binder known in the art may be used as the binder.

For example, the binder may be fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The binder may be included in an amount of from 1 to 10 parts by weight, preferably about from 5 parts by weight based on 100 parts by weight of the slurry composition for the positive electrode. When the content of the binder is less than the above range, the physical properties of the positive electrode may be deteriorated, and thus and the positive electrode active material and the electrically conductive material may be detached. When the content exceeds the above range, since the ratio of the active material to the electrically conductive material in the positive electrode is relatively reduced, the battery capacity may be reduced. Therefore, it is preferable that the content is appropriately determined within the above-described range.

The positive electrode may be prepared by a conventional method known in the art. For example, the positive electrode may be prepared by mixing and stirring a solvent, if necessary, a binder, an electrically conductive material and a dispersant in a positive electrode active material to prepare slurry, then applying (coating) the slurry to a current collector of a metal material, compressing and drying it.

As a solvent, a solvent capable of uniformly dispersing the positive electrode active material, the binder, and the electrically conductive material may be used. As such a solvent, water is most preferred as an aqueous solvent. At this time, water may be distilled water or deionzied water, but is not necessarily limited thereto, and if necessary, a lower alcohol which can be easily mixed with water may be used. Examples of the lower alcohol may comprise methanol, ethanol, propanol, isopropanol and butanol. Preferably, they may be used in admixture with water.

The porosity of the positive electrode, specifically the positive electrode active material layer, prepared by the above-described composition and manufacturing method may be from 60 to 75%, preferably from 60 to 70%. When the porosity of the positive electrode does not reach 60%, since the filling degree of the slurry composition for the positive electrode including the positive electrode active material, the electrically conductive material, and the binder is too high, so that sufficient electrolyte solution capable of exhibiting ionic conductivity and/or electrical conduction between the positive electrode active materials cannot be maintained, there may be a problem that the output characteristics or cycle characteristics of the battery may be deteriorated, and the overvoltage and the loss of the discharging capacity of the battery become severe. On the contrary, when the porosity of the positive electrode exceeds 75% and has an excessively high porosity, there is a problem that the physical and electrical connection with the current collector is lowered, so the adhesive strength is lowered and the reaction becomes difficult, and also there is a problem that the energy density of the battery may be lowered by filling the increased porosity with the electrolyte solution. Therefore, the porosity is appropriately adjusted within the above range.

The negative electrode may comprise a material capable of reversibly intercalating or deintercalating lithium ($Li^+$) into the negative electrode active material, a material capable of reversibly forming lithium containing compounds by reacting with lithium ion, or lithium metal or lithium alloy.

The material capable of reversibly intercalating or deintercalating lithium ion ($Li^+$) may be, for example, crystalline carbon, amorphous carbon or a mixture thereof. The material capable of reacting with lithium ion ($Li^+$) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the negative electrode active material may be lithium metal, and specifically may be in the form of a lithium metal thin film or lithium metal powder.

The negative electrode current collector is as described for the positive electrode current collector.

In addition, the negative electrode may further comprise additives such as a binder, an electrically conductive material and a thickener, and is not particularly limited as long as they are typical materials used in manufacturing a negative electrode. The binder and the electrically conductive material are as described in the positive electrode.

The separator is as described above.

The electrolyte comprises lithium ions and is used for causing an electrochemical oxidation or reduction reaction between a positive electrode and a negative electrode through these.

The electrolyte may be a non-aqueous electrolyte solution or a solid electrolyte which does not react with lithium metal, but is preferably a non-aqueous electrolyte, and comprises an electrolyte salt and an organic solvent.

The electrolytic salt which is comprised in the non-aqueous electrolyte is lithium salt. The lithium salt may be used without limitation as long as it is commonly used in an electrolyte for a lithium secondary battery. For example, the lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, LiN(SO$_2$F)$_2$, lithium chloroborane, lithium lower aliphatic carboxylate, 4-phenyl lithium borate, lithium imide, etc.

The concentration of the lithium salt may be from 0.2 to 2 M, preferably from 0.4 to 2 M, more preferably from 0.4 to 1.7 M depending on various factors such as the exact composition of the electrolyte solvent mixture, the solubility of the salt, the conductivity of the dissolved salt, the charging and discharging conditions of the battery, the operating temperature, and other factors known in the lithium battery field. When the concentration of the lithium salt is less than 0.2 M, the conductivity of the electrolyte may be lowered and thus the performance of the battery may be deteriorated. When the concentration of the lithium salt is more than 2 M, the viscosity of the electrolyte may increase and thus the mobility of the lithium ion may be reduced.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, ether-based compounds may be comprised.

The ether-based compound may comprise acyclic ethers and cyclic ethers.

For example, the acyclic ether may be, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether.

For example, the cyclic ether may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene and isosorbide dimethyl ether.

Examples of the ester of the organic solvent may include, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ϑ-caprolactone, and a mixture of two or more thereof.

Specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halides thereof, or a mixture of two or more thereof. Examples of such halides include, but are not limited to, fluoroethylene carbonate (FEC) and the like.

The injection of the nonaqueous electrolyte solution may be performed at an appropriate stage of the manufacturing processes of the electrochemical device, depending on the manufacturing process and required properties of the final product. That is, the injection may be performed before assembling the electrochemical device or at the final stage of assembling the electrochemical device.

The lithium secondary battery according to the present invention may be manufactured by lamination, stacking, and folding processes of the separator and the electrodes, in addition to the usual winding process.

The shape of the lithium secondary battery is not particularly limited, and may be various shapes such as a cylindrical shape, a laminate shape and a coin shape.

Also, the present invention provides a battery module including the lithium-sulfur battery described above as a unit battery.

The battery module may be used as a power source for medium to large-sized devices requiring high temperature stability, long cycle characteristics, high capacity characteristics, and the like.

Examples of such medium to large-sized devices may comprise, but is not limited to, a power tool powered and moved by an electric motor; an electric car including an electric vehicle (EV), a hybrid electric vehicle (HEV), a plug-in hybrid electric vehicle (PHEV), and the like; an electric two-wheeled vehicle including an electric bike (E-bike) and an electric scooter (E-scooter); an electric golf cart; a power storage system, etc.

Mode for Invention

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and those such variations and modifications are within the scope of the appended claims.

PREPARATION EXAMPLE

Preparation Example 1

50 g of sodium montmorillonite (K 10, manufactured by Sigma Aldrich) was added to 1 L of a 1.0 M sulfuric acid solution and stirred at room temperature (25° C.) for 24 hours.

The solution obtained by stirring was centrifuged to remove the solvent, and dried in an oven at 80° C. for 12 hours to prepare hydrogen-modified montmorillonite (H-MMT).

Preparation Example 2

50 g of hydrogen-modified montmorillonite (H-MMT) obtained from Preparation Example 1 was added to 1 L of 1.0 M lithium hydroxide solution and stirred at room temperature (25° C.) for 24 hours.

The solution obtained by stirring was centrifuged to remove the solvent, and dried in an oven at 80° C. for 12 hours to prepare lithium modified montmorillonite (Li-MMT).

Preparation Example 3

50 g of sodium montmorillonite (K 10, manufactured by Sigma Aldrich) was dried in an oven at 155° C. for 1 hour to obtain unmodified bare montmorillonite.

Preparation Example 4

50 g of hydrogen modified montmorillonite (H-MMT) obtained from Preparation Example 1 was added to 1 L of a 1.0 M ammonium hydroxide solution and stirred at room temperature (25° C.) for 24 hours.

The solution obtained by stirring was centrifuged to remove the solvent, and dried in an oven at 80° C. for 12 hours to prepare ammonium modified montmorillonite ($NH_4$-MMT)

EXAMPLE AND COMPARATIVE EXAMPLE

Example 1

As a porous substrate, a 20 μm polyethylene (porosity 68%) film was prepared.

A coating composition including 1% by weight of hydrogen modified montmorillonite (H-MMT) obtained in Preparation Example 1 in ethanol was coated on the porous substrate to form an inorganic coating layer, and then dried at 60° C. for 12 hours to prepare a separator for a lithium-sulfur battery having an inorganic coating layer of 1 μm thickness.

Example 2

A separator for a lithium-sulfur battery was prepared in the same manner as in Example 1, except that instead of the hydrogen modified montmorillonite (H-MMT) of Preparation Example 1, the lithium modified montmorillonite (Li-MMT) obtained in the same amount of Preparation Example 2 is used as a coating composition.

Example 3

90 parts by weight of sulfur-carbon composite (S/C 7:3 parts by weight) as positive electrode active material, 5 parts by weight of denka black as a conductive material and 5 parts by weight of styrene butadiene rubber/carboxymethyl cellulose as a binder (SBR/CMC 7:3)) were added and mixed to prepare a slurry composition for a positive electrode.

Subsequently, the prepared slurry composition for a positive electrode was coated on an aluminum current collector, dried at 50° C. for 12 hours, and pressed with a roll press machine to prepare a positive electrode. The loading amount of the obtained positive electrode was 5.4 mAh/cm$^2$, and the porosity of the positive electrode was 68%.

Along with the positive electrode, a thin film of lithium metal having a thickness of 35 μm was used as the negative electrode. As an electrolyte, a mixed solution prepared by dissolving 1M of lithium bis (trifluoromethanesulfonyl) imide (LiTFSI) and 1% by weight of lithium nitrate ($LiNO_3$) in an organic solvent composed of 1,3-dioxolane and dimethyl ether (DOL:DME=1:1 (volume ratio)) was used.

Specifically, the positive electrode and the negative electrode manufactured were placed to face each other and the separator obtained in Example 1 was placed therebetween, and then 0.1 ml of the prepared electrolyte was injected to prepare a lithium-sulfur battery.

Example 4

A lithium-sulfur battery was manufactured in the same manner as in Example 3, except for using the separator obtained in Example 2.

Comparative Example 1

The porous substrate of Example 1 was manufactured as a separator for a lithium-sulfur battery, except that the inorganic coating layer was not formed.

Comparative Example 2

A separator for a lithium-sulfur battery was manufactured in the same manner as in Example 1, except that the same content of the bare montmorillonite obtained from Preparation Example 3 instead of hydrogen modified montmorillonite (H-MMT) of Preparation Example 1 is used as the coating composition.

Comparative Example 3

A separator for a lithium-sulfur battery was manufactured in the same manner as in Example 1, except that the same content of the ammonium modified montmorillonite ($NH_4$-MMT) obtained from Preparation Example 4 instead of hydrogen modified montmorillonite (H-MMT) of Preparation Example 1 is used as the coating composition.

Comparative Example 4

A coating composition comprising 90% by weight of lithium modified montmorillonite (Li-MMT) obtained in Preparation Example 2 and 10% by weight of polyvinylidene fluoride (weight average molecular weight ($M_w$): 534,000, prepared by Sigma Aldrich) in N-methyl-2-pyrrolidone was coated on a porous substrate comprising a 20 μm polyethylene (porosity 68%) film to form a coating layer, and then dried at 80° C. for 12 hours to obtain a separator for a lithium-sulfur battery with a coating layer having a thickness of 10 μm.

Comparative Example 5

A lithium-sulfur battery was manufactured in the same manner as in Example 3, except that the separator obtained in Comparative Example 1 was used.

Comparative Example 6

A lithium-sulfur battery was manufactured in the same manner as in Example 3, except that the separator obtained in Comparative Example 2 was used.

Comparative Example 7

A lithium-sulfur battery was manufactured in the same manner as in Example 3, except that the separator obtained in Comparative Example 3 was used.

Comparative Example 8

A lithium-sulfur battery was manufactured in the same manner as in Example 3, except that the separator obtained in Comparative Example 4 was used.

Experimental Example 1. Scanning Electron Microscope Analysis

The montmorillonite according to Preparation Examples 1 to 4 was observed with a scanning electron microscope (SEM). S-4800 from Hitachi company was used as a scanning electron microscope. The results obtained at this time are shown in FIG. 1.

Referring to FIG. 1, it can be confirmed that in the case of modified montmorillonite prepared according to Preparation Examples 1 and 2 (see a) and b) in FIG. 1), it has the form of a thin nanosheet with an exfoliated interlayer structure. In comparison, it can be confirmed that in the case of unmodified montmorillonite according to Preparation Example 3 (see FIG. 1c), it was not exfoliated at all, and in the case of ammonium modified montmorillonite according to Preparation Example 4 (see FIG. 1d), the degree of exfoliating was significantly lower than in Preparation Examples 1 and 2.

Experimental Example 2. X-ray diffraction analysis

X-ray diffraction (XRD) analysis was performed on montmorillonite according to Preparation Examples 1 to 4. The XRD device used for the analysis was a Rigaku MiniFlex 600 X-ray diffraction analysis instrument using a 1.5418 Å Cu-Kα X-ray wavelength as a solid phase detector. The results obtained at this time are shown in FIG. 2.

Figure 2:
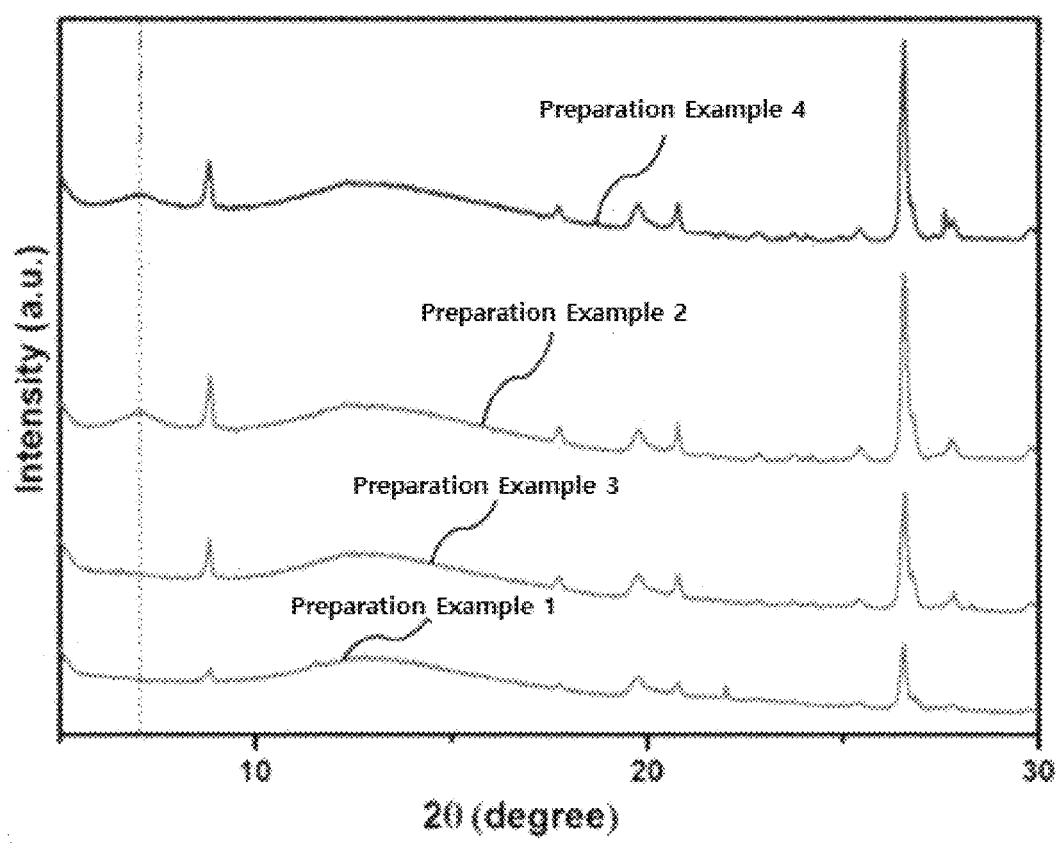
FIG. 2 is a graph showing the results of X-ray diffraction analysis of Preparation Examples 1 to 4 according to Experimental Example 2 of the present invention.

Referring to FIG. 2, it was confirmed that in the case of Preparation Examples 1 and 2, an effective diffraction peak was observed at a diffraction angle (2θ) of 7.0±1.0°, and thus modified montmorillonite according to the present invention was prepared.

Experimental Example 3. Scanning Electron Microscope Analysis

The separators prepared in Examples 3 and 4 and Comparative Examples 6 and 7 were observed with a scanning electron microscope (SEM). S-4800 from Hitachi company was used as a scanning electron microscope. The results obtained at this time are shown in FIG. 3.

Figure 3:
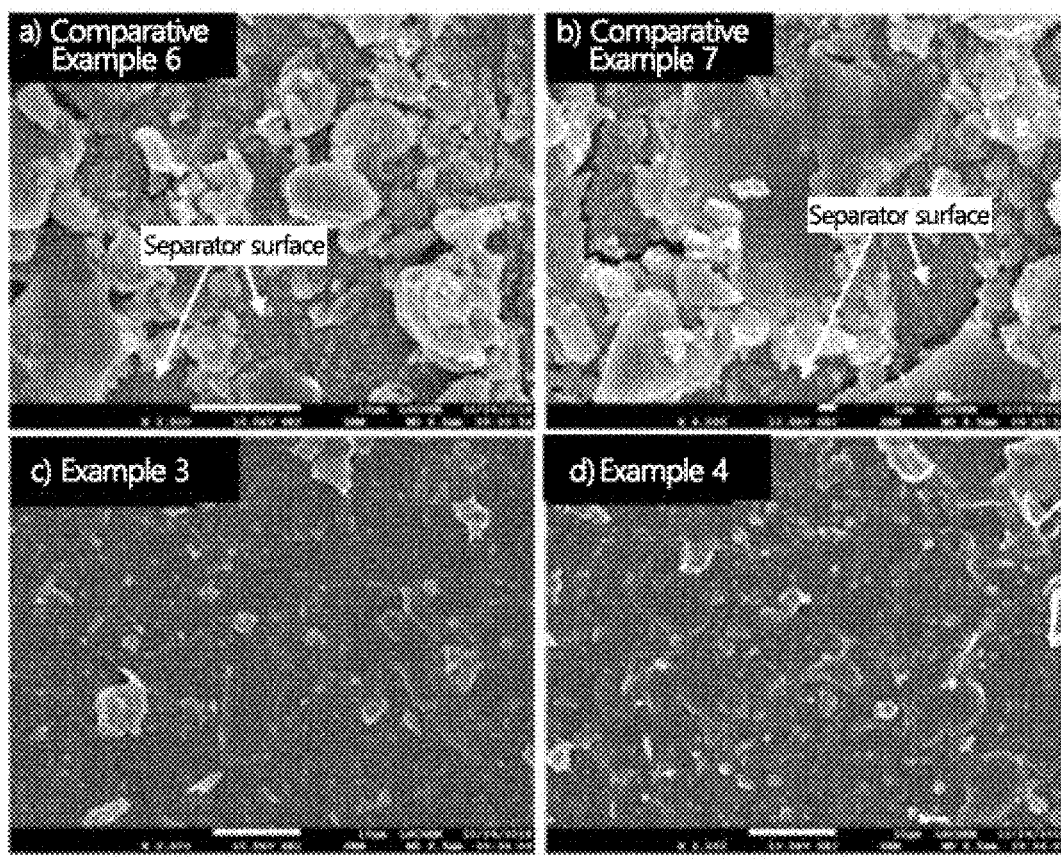
FIG. 3 is an image from a scanning electron microscope (SEM) of the separator according to the examples and comparative examples of the present invention (a) Comparative Example 6, b) Comparative Example 7, c) Example 3, d) Example 4).

It can be confirmed through FIG. 3 that in the case of Examples 3 and 4 (see c) and d) of FIG. 3), as the modified montmorillonite exfoliated sufficiently is contained in the inorganic coating layer, the inorganic coating layer is formed uniformly without exposing the surface of the porous substrate. In comparison, it can be confirmed that in the case of Comparative Examples 6 and 7 (see a) and b) in FIG. 3), despite the same coating amount per unit area as Example 1 and 2, the surface of the separator, that is, the surface of the porous substrate is exposed, and this is because the inorganic coating layer contains insufficiently exfoliated montmorillonite, and that the uniformity of the coating differs depending on the degree of exfoliating.

Experimental Example 4. Evaluation of Lifetime Characteristics of Battery

The cells prepared in Examples 3 and 4 and Comparative Examples 5 to 8 were repeatedly discharged and charged three times with a current density of 0.1 C, and then discharged and charged three times with a current density of 0.2 C, and thereafter discharging capacity and Coulomb efficiency were measured, while discharging at 0.5 C and charging at 0.3 C, to evaluate the lifetime characteristics of the batteries. The results obtained at this time are shown in FIGS. 4 and 5.

Figure 4:
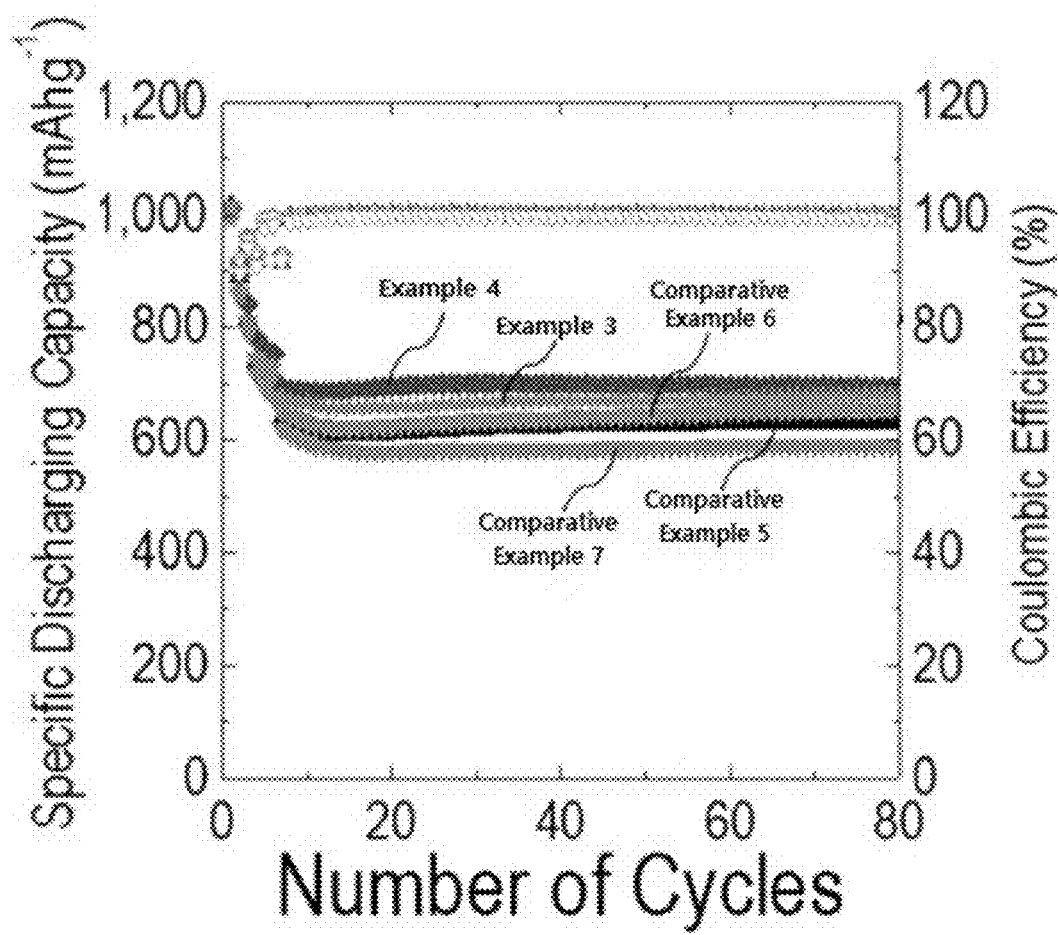
FIG. 4 is a graph showing evaluation results of lifetime characteristics of the batteries of Examples 3 and 4 and Comparative Examples 5 to 7 according to Experimental Example 4 of the present invention.
Figure 5:
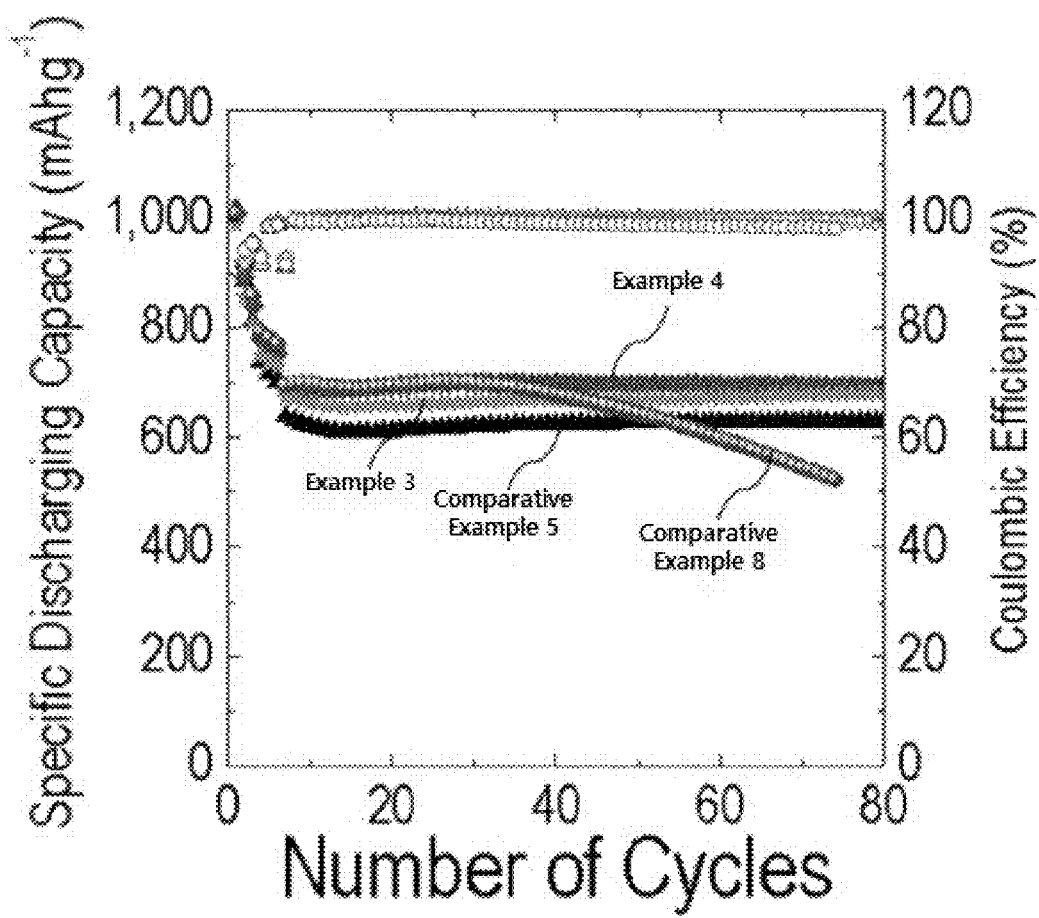
FIG. 5 is a graph showing evaluation results of lifetime characteristics of the batteries of Example 3, Example 4, Comparative Example 5, and Comparative Example 8 according to Experimental Example 4 of the present invention.

As shown in FIGS. 4 and 5, it can be seen that in the case of the battery according to the examples, the numbers of discharging capacity are higher than those of the comparative examples, and the Coulomb efficiencies are also excellent, thereby improving lifetime characteristics.

As shown in FIG. 5, it can be confirmed that in Comparative Example 7 including the separator of Comparative Example 4 having a coating layer together with a polymer serving as a binder, although the initial discharging capacity characteristic is excellent, the lifetime characteristic is inferior because the discharging capacity rapidly decreases around 30 cycles.

From these results, it can be seen that in the case of using the separator comprising the inorganic coating layer according to the present invention, the lithium polysulfide leached from the positive electrode was adsorbed on the inorganic coating layer by modified montmorillonite uniformly distributed in the inorganic coating layer, so that the capacity characteristics of the lithium-sulfur battery are excellent and the lifetime characteristics are also improved.

The invention claimed is:

1. A separator for a lithium-sulfur battery comprising:
a porous substrate; and
an inorganic coating layer present on at least one surface of the porous substrate,
wherein the inorganic coating layer consists of a modified montmorillonite in which cations in montmorillonite are substituted with at least one ion selected from the group consisting of hydrogen ion, lithium ion, potassium ion, rubidium ion, cesium ion, iron ion, manganese ion and nickel ion.

2. The separator for the lithium-sulfur battery according to claim 1, wherein the montmorillonite comprises at least one selected from the group consisting of sodium montmorillonite, calcium montmorillonite and magnesium montmorillonite.

3. The separator for the lithium-sulfur battery according to claim 2, wherein the montmorillonite comprises sodium montmorillonite.

4. The separator for the lithium-sulfur battery according to claim 1, wherein the modified montmorillonite is substituted with at least one ion selected from the group consisting of hydrogen ion and lithium ion.

5. The separator for the lithium-sulfur battery according to claim 1, wherein the modified montmorillonite has an exfoliated layered structure.

6. The separator for the lithium-sulfur battery according to claim 5, wherein the modified montmorillonite is in a form of a nanosheet.

7. The separator for the lithium-sulfur battery according to claim 6, wherein the modified montmorillonite has a thickness of from 3 nm to 100 nm.

8. The separator for the lithium-sulfur battery according to claim 1, wherein the modified montmorillonite has diffraction peaks that appear in the range of diffraction angles (2θ) of 7.0±1.0°, 9.0±1.0°, 20.0±1.0°, 26.5±1.0° and 28.0±0.5°, respectively, as measured by X-ray diffraction (XRD).

9. The separator for the lithium-sulfur battery according to claim 1, wherein the inorganic coating layer has a thickness of from 0.1 μm to 10 μm.

10. A lithium-sulfur battery comprising: a positive electrode, a negative electrode, a separator interposed therebetween and an electrolyte,
wherein the separator comprises the separator according to claim 1.

11. The separator for the lithium-sulfur battery according to claim 2, wherein the montmorillonite comprises sodium montmorillonite, wherein a content of sodium ion present in the modified montmorillonite in the inorganic coating layer is 0.4% or less.

12. The separator for the lithium-sulfur battery according to claim 2, wherein the montmorillonite comprises calcium montmorillonite, wherein a content of calcium ion present in the modified montmorillonite in the inorganic coating layer is 0.2% or less.

* * * * *